(12) United States Patent
Unpingco et al.

(10) Patent No.: US 9,298,339 B2
(45) Date of Patent: Mar. 29, 2016

(54) USER INTERFACE FEEDBACK ELEMENTS

(71) Applicant: Microsoft Corporation, Redmond, WA (US)

(72) Inventors: Edward Joseph Unpingco, Snoqualmie, WA (US); Reena Agarwal, Bellevue, WA (US); Shuyi Hu, Bellevue, WA (US); Karthik Bhaskar, Redmond, WA (US); Hambardzum Abajyan, Bellevue, WA (US); Emilio Matthew Soto, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 324 days.

(21) Appl. No.: 13/865,366

(22) Filed: Apr. 18, 2013

(65) Prior Publication Data
US 2014/0317539 A1  Oct. 23, 2014

(51) Int. Cl.
*G06F 3/0481* (2013.01)
*G06F 17/30* (2006.01)
*G06F 3/0482* (2013.01)
*G06F 3/0488* (2013.01)

(52) U.S. Cl.
CPC ............ *G06F 3/0481* (2013.01); *G06F 3/0482* (2013.01); *G06F 3/04883* (2013.01); *G06F 17/30648* (2013.01); *G06F 17/30651* (2013.01)

(58) Field of Classification Search
None
See application file for complete search history.

(56) References Cited

U.S. PATENT DOCUMENTS

| | | |
|---|---|---|
| 2007/0203869 A1 | 8/2007 | Ramsey et al. |
| 2010/0049766 A1* | 2/2010 | Sweeney et al. ............ 707/737 |
| 2010/0205190 A1 | 8/2010 | Morris et al. |
| 2011/0131204 A1 | 6/2011 | Bodin et al. |
| 2011/0225107 A1 | 9/2011 | Khosravy |
| 2011/0302217 A1 | 12/2011 | Heidasch |
| 2011/0313779 A1 | 12/2011 | Herzog et al. |
| 2011/0313954 A1 | 12/2011 | Zhao et al. |

FOREIGN PATENT DOCUMENTS

WO    2014025711 A1    2/2014

OTHER PUBLICATIONS

Halpin et al., "Relevance Feedback between Hypertext and Semantic Web Search: Frameworks and Evaluation", Journal of Web Semantics: Science, Services and Agents on the World Wide Web, Dec. 2011, 23 pages, vol. 9, Issue 4.
Jansen et al, "MudPad: Localized Tactile Feedback on Touch Surfaces", Proceeding of 23rd Annual ACM Symposium on User Interface Software and Technology, Oct. 3, 2010, 2 pages.

(Continued)

*Primary Examiner* — Edward Martello
(74) *Attorney, Agent, or Firm* — David Ream; Leonard Smith; Micky Minhas

(57) ABSTRACT

Architecture that implements fact interactive elements and list interactive elements in a user interface (UI) to assist in obtaining user feedback on entity attributes for semantic web and structured data searches to ensure data correctness, freshness, and user relevance. The fact interactive element enables user interaction with the attribute data of the corresponding attribute. The user interaction then provides feedback as to correctness of the attribute data for the given attribute. Each state has a corresponding visual state which has a clear visual distinction from other states. The interactive elements enable the use of standard user inputs such as with input devices, as well as interaction using gestures such as associated with natural user interface (NUI) gestures.

20 Claims, 15 Drawing Sheets

(56) References Cited

OTHER PUBLICATIONS

Mendoza et al., "Implementation of a Touch Based Graphical User Interface for Semantic Information System", In International Conference on Computer Graphics and Virtual Reality, Jul. 16, 2012, 5 pages.

Liao et al., "PapierCraft: A Gesture-Based Command System for Interactive Paper", Journal of ACM Transactions on Computer-Human Interaction, Jan. 2008, 31 pages, vol. 14, Issue 4.

"International Search Report Received for PCT Application No. PCT/US2014/034438", Mailed Date: Aug. 1, 2014, 4 Pages.

Kim, et al., "Image Retrieval Model Based on Weighted Visual Features Determined by Relevance Feedback", In International Journal on Information Sciences, vol. 178, Issue 22, Nov. 15, 2008, 13 Pages.

Yong, et al., "A Relevance Feedback Architecture for Content-Based Multimedia Information Retrieval Systems", In IEEE Workshop on Content-Based Access of Image and Video Libraries, Jun. 20, 1997, pp. 82-89.

* cited by examiner

USER INTERFACE FEEDBACK ELEMENTS

BACKGROUND

Effectively searching the ever-increasing amounts of data continues to be a challenge for the user, and providing improved search capabilities similarly continues to be a competitive challenge for search engine providers. One technique for improving search effectiveness attempts to obtain user feedback. For semantic web and structured data searches, while user feedback on entity attributes and lists is desired to ensure data correctness, freshness, and user relevance, obtaining positive/negative feedback and suggested changes are problematic.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture implements interactive feedback elements such as fact interactive elements and list interactive elements in a user interface (UI) to assist in obtaining user feedback on entity attributes for semantic web and structured data searches to ensure data correctness, freshness, and user relevance.

The UI presents web and structured data, which includes data items defined according to entities and corresponding entity attributes. The entity attributes comprise attribute data (values) which may be correct, incorrect, or missing, and for which user feedback is desired. A fact interactive element is associated with each entity attribute. The fact interactive element enables user interaction with the attribute data of the corresponding attribute. The user interaction then provides feedback as to correctness of the attribute data for the given attribute. Each state for the interactive elements has a corresponding visual state which has a clear visual distinction from other states. The interactive elements enable use of standard user inputs such as with input devices, as well as interaction using gestures such as associated with natural user interface (NUI) gestures.

The architecture employs crowd-sourcing and suggested information to assist in user feedback of the web and structured data. The crowd-sourced data can be obtained in real-time (processed in the timespan that the actual event is occurring)—as other users are addressing the same attribute value, or from a data source that captures and stores the crowd-sourced data, and which analysis can be performed by a crowd-sourcing component to derive the top popular crowd-sourced value(s) for that attribute. In any case, the crowd-sourced attribute value(s) (a single value or a list of the top values) can be presented in the UI.

A suggestion component can be employed that processes the crowd-sourced data (directly and/or via the crowd-sourcing component) to derive suggested attribute value(s) (for presentation in the UI). The suggested attribute value(s) can be derived from the crowd-sourced data, from other data sources (e.g., online sources such as websites, other structured data sources, offline sources, etc.), or both. The crowd-sourced value(s) can be presented in the UI as a single crowd-sourced value or a list of crowd-sourced values. Similarly, the suggested value(s) can be presented as a single suggested value or a list of suggested values.

In addition to standard UI element properties, the single fact interactive feedback element defines (at least) the additional properties: attribute type, original value, state, and suggested value. The list interactive feedback element includes a collection of list items, where each of the list items has at least the properties of value, original position, and suggested position.

A gesture processing component and a presentation component are provided. The presentation component can include the hardware and software typically provided and enabled for user interaction with touch-sensitive displays and application user interfaces. The gesture processing component comprises the hardware and software capabilities at least for speech recognition, voice recognition, face recognition, pose recognition for body part and appendages.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
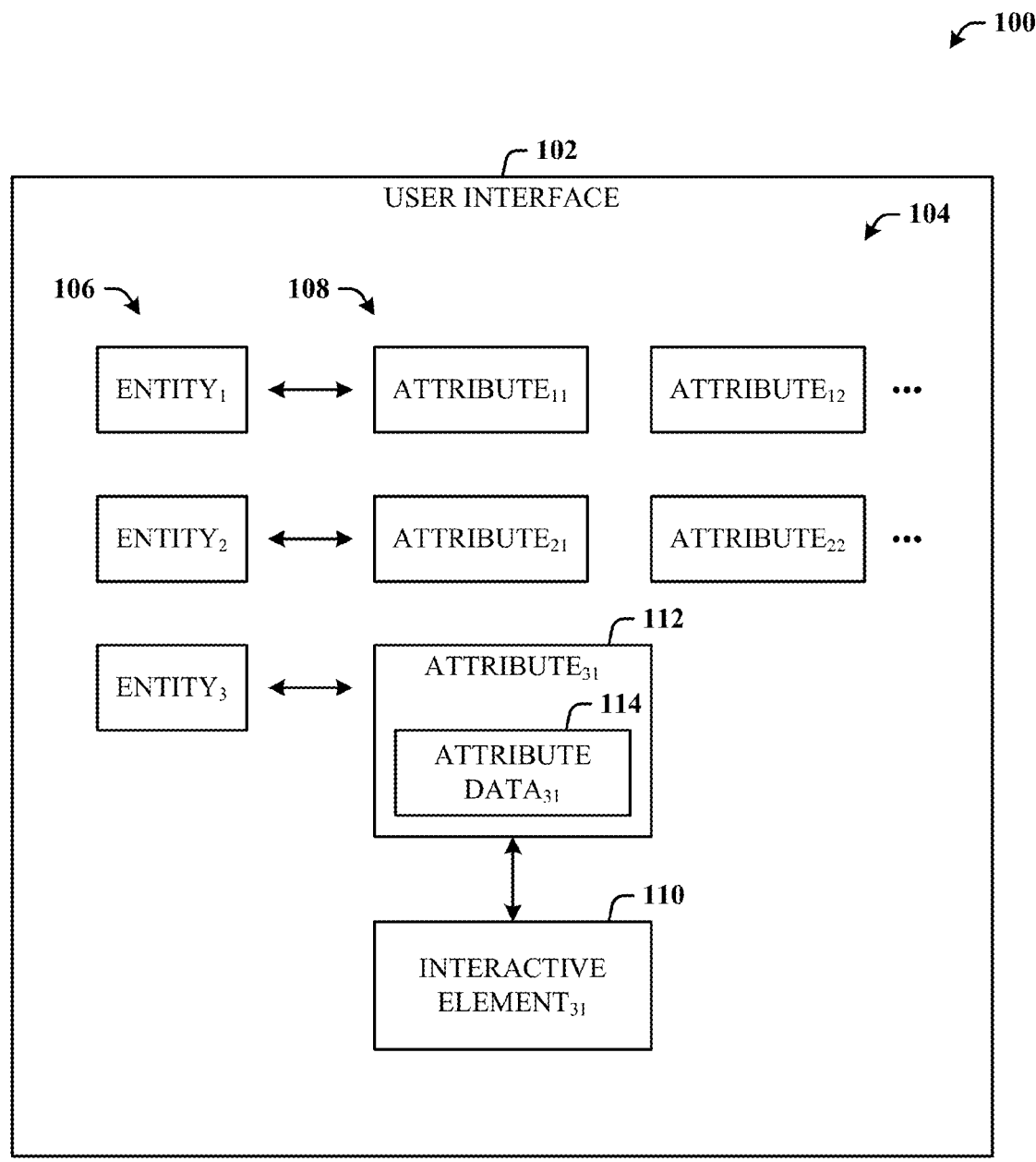
FIG. 1 illustrates a system in accordance with the disclosed architecture.

The disclosed architecture implements interactive feedback elements such as fact interactive elements and list interactive elements in a user interface (UI) to assist in obtaining user feedback on entity attributes and lists for semantic web and structured data searches to improve data correctness, freshness, and user relevance in the data.

The UI presents web and structured data, which includes data items defined according to entities and corresponding entity attributes. The entity attributes comprise attribute data (values) which may be correct, incorrect, or missing, and for which user feedback is desired. A fact interactive element is associated with each entity attribute. The fact interactive element enables user interaction with the attribute data of the corresponding attribute. The user interaction then provides feedback as to correctness of the attribute data for the given attribute. Each state for the interactive elements has a corresponding visual state which has a clear visual distinction from other states. The interactive elements enable use of standard user inputs such as with input devices, as well as interaction using gestures such as associated with natural user interface (NUI) gestures.

Interactive elements are interface objects that represent the state of an ongoing operation or transformation, either as visual reminders of the user intent (e.g., a pointer), or as affordances showing places where the user may interact.

On a touch/gesture enabled computing device, users are presented with an entity and its entity attributes from an entity database (e.g., local phone book, celebrity listing, etc.). The UI provides the ability to confirm correctness of an attribute, indicate flag incorrectness, and enable in-place attribute editing. In one implementation of a touch/gesture enabled device, the UI provides ability to tap an attribute to confirm its correctness, to double-tap an attribute to flag it as incorrect, and to tap-and-hold on an attribute to enable attribute editing in place; however, it is to be appreciated that other gesture/touch interactions can be employed. An attribute editing mode enables the user to suggest an edit to the attribute by substituting a recommended change. Feedback can also be performed as to reversion of an attribute value by a "wiping" gesture (translation manipulation) on the element.

Additional states such as showing realtime feedback (as users are providing the feedback) and historical feedback (from previously provided and stored information) from other users can be added and invoked by other gestures, such as zoom and rotation. For non-text content such as pictures, contact-free gestures and multi-touch gestures can provide more natural ways for the user to provide feedback. Speech commands can also be integrated with gestures.

In addition to obtaining feedback on single fact/attribute of an entity, oftentimes there is a need to obtain feedback on duplicate items and item relevance. In such scenarios, results can be presented to the user in an ordered list of items.

A common standard UI element is provided that enables the user to "snap" items together (e.g., a multi-touch gesture, using a finger from each hand, for example, to visually bring two duplicate items together) to mark the items as duplicates, drag items to a desired place (order) in the list, zoom-out from an item to revert (undo) duplicate feedback, zoom-out two adjacent items to add a new item in-between, and perform a "wipe" to delete/undelete an item.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a system 100 in accordance with the disclosed architecture. The system 100 includes a user interface 102 that presents structured data 104. The structured data 104 includes data items defined according to entities 106 and corresponding entity attributes 108. The entity attributes 108 comprise attribute data which may be correct, incorrect, or missing, and for which user feedback is desired in a gestured-enable search environment, for example. An interactive element is associated with each entity attribute. The interactive element enables user interaction with the attribute data of the corresponding attribute. The user interaction then provides feedback as to correctness of the attribute data for the given attribute.

Accordingly, an interactive (feedback) element 110 is associated with an attribute 112 that enables user interaction with attribute data 114 of the attribute 112. The interactive element 110 enables use of standard user inputs such as with input devices, but also interaction using gestures such as associated with natural user interface (NUI) gestures.

NUI may be defined as any interface technology that enables a user to interact with a device in a "natural" manner, free from artificial constraints imposed by input devices such as mice, keyboards, remote controls, and the like. Examples of NUI methods include those methods that employ gestures, broadly defined herein to include, but not limited to, speech recognition, touch and stylus recognition, gesture recognition both on screen and adjacent to the screen, air gestures, head and eye tracking, voice and speech utterances, and machine learning related at least to vision, speech, voice, pose, and touch data.

NUI technologies include, but are not limited to, touch sensitive displays, voice and speech recognition, intention and goal understanding, motion gesture detection using depth cameras (e.g., stereoscopic camera systems, infrared camera systems, color camera systems, and combinations thereof), motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (e.g., electro-encephalograph (EEG)) and other neuro-biofeedback methods.

On a touch/gesture enabled computing device, for example, a user is presented with an entity and its associated entity attributes. For example, an entity of a local business can include attributes of business name, address, city, state, phone, category, etc., and a celebrity entity can include entity attributes of name, date of birth, date of death, profession, etc. These can be obtained from a structured entity database such as a local phone book, celebrity listing, etc.

The user interaction comprises one or more natural user interface gestures. The user interaction enables confirmation of correctness of the attribute or incorrectness (the state of being incorrect) of the attribute. The user interaction enables editing of the attribute data. The interactive element 110 includes one or more states that enable presentation of live and historical feedback of other users. The user interaction provides relevance of the entity or entity attribute as part of the feedback. The interactive element 110 includes one or more states that enable user interaction to change ranking of the entity or the entity attribute. The system can further comprising a list feedback element 702 that enables manipulation of multiple entity/attribute items in a list of the structured data.

Figure 2:
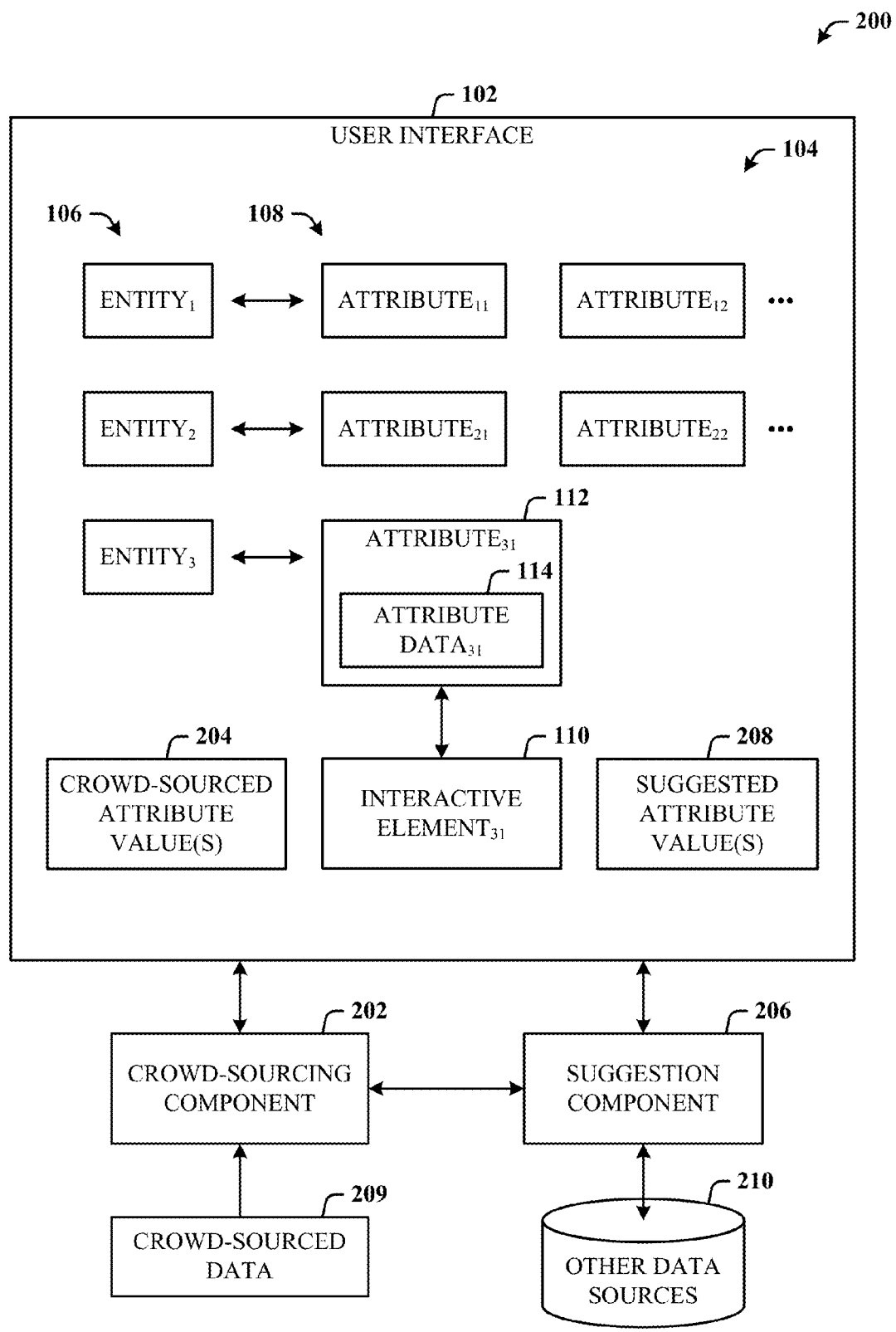
FIG. 2 illustrates an alternative embodiment of a system that employs crowd-sourcing and suggested information to assist in user feedback of structured data.

FIG. 2 illustrates an alternative embodiment of a system 200 that employs crowd-sourcing and suggested information to assist in user feedback of structured data. Crowd-sourcing obtains services, ideas, and/or content by soliciting or capturing data from a collection of people, and particularly people from an online community, rather than from traditional employees or suppliers, although the employees and/or suppliers can be part of the collection. This process can occur both online and offline. Crowd-sourcing is different from ordinary outsourcing, in that crowd-sourcing is an online, distributed problem-solving and production model.

Accordingly, the system 200 includes the entities and components of the system 100 of FIG. 1, and additional entities and components, such as a crowd-sourcing component 202 that accesses and processes crowd-sourced data 209. The crowd-sourced data 209 can be obtained in realtime—as other users are addressing the same attribute value, or from a data source that captures and stores the crowd-sourced data 209, and which analysis can be performed by the crowd-sourcing component 202 to derive the top popular crowd-sourced value(s) 204 for that attribute. In any case, the crowd-sourced attribute value(s) 204 (a single value or a list of the top values) can be presented in the UI 102.

It can be the case that a suggestion component 206 is employed that processes the crowd-sourced data 209 (directly and/or via the crowd-sourcing component 202) to derive suggested attribute value(s) 208 (for presentation in the UI 102). The suggested attribute value(s) 208 can be derived from the crowd-sourced data 209, from other data sources 210 (e.g., online sources such as websites, other structured data sources, offline sources, etc.), or both.

The crowd-sourced value(s) 204 can be presented in the UI 102 as a single crowd-sourced value or a list of crowd-sourced values. Similarly, the suggested value(s) 208 can be presented as a single suggested value or a list of suggested values.

Figure 3:
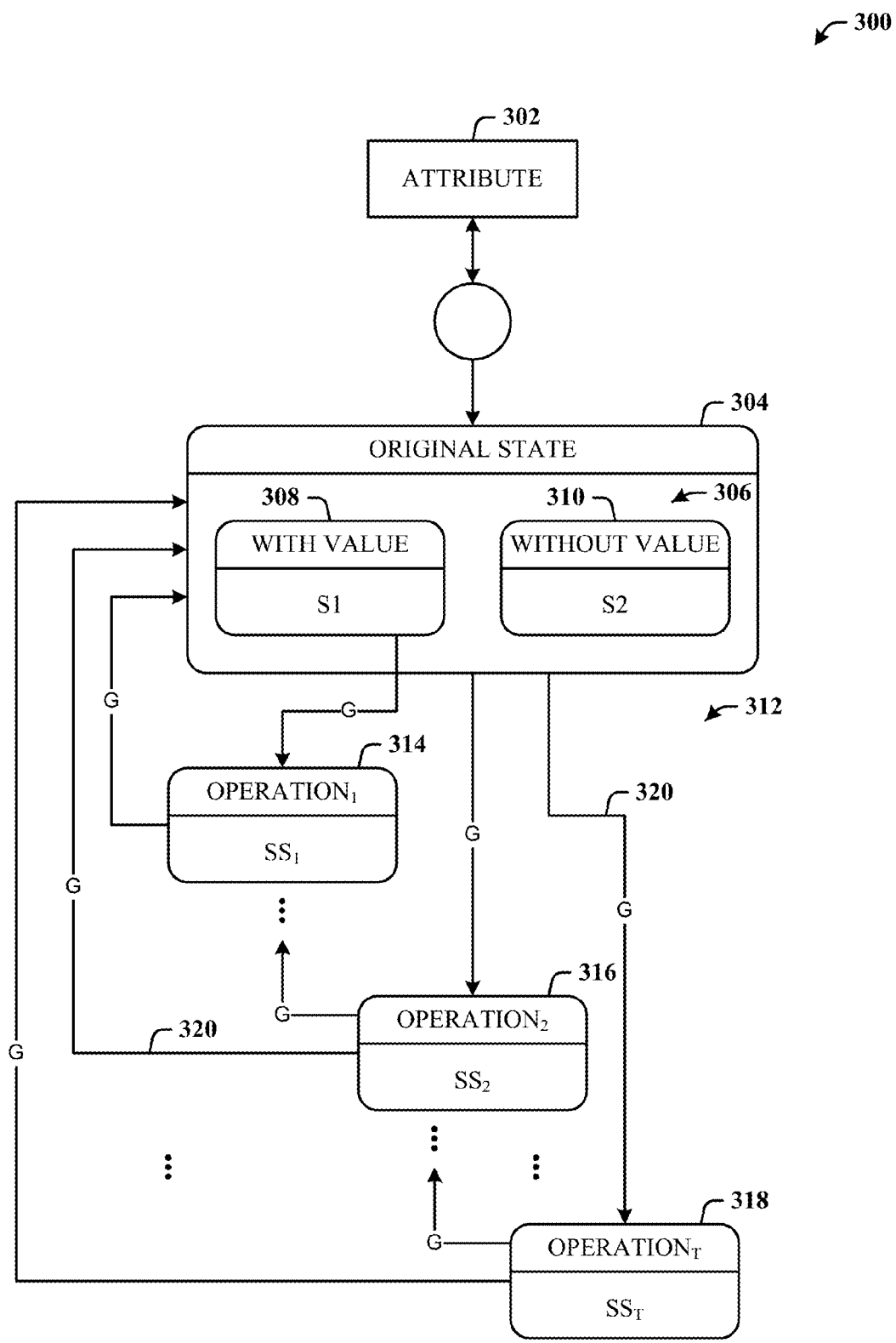
FIG. 3 illustrates a generalized interactive fact feedback element and state diagram for user interaction with an entity attribute in accordance with the disclosed architecture.

FIG. 3 illustrates a generalized interactive fact feedback element 300 and state diagram for user interaction with an entity attribute 302 in accordance with the disclosed architecture. An instance of the interactive feedback element 300 can be provided for each attribute (data item) presented in the user interface (UI) 102.

As depicted, the feedback element 300 has a state property, and an original state 304 as associated with an attribute value. The state property is just one of several properties that can be employed for the feedback element 300 (and similarly, the interactive element 110 of FIG. 1). Other properties include attribute type, original value, and suggested value, for example. The value can have one or more original value states 306. In this exemplary generalized interactive feedback element 300 for user interaction and feedback, the original state 304 includes a with-value state (S1) 308 and a without-value state (S2) 310.

Additionally, operation states 312 relate to the original state 304 and included value states 306. The operation states 312 are operations that can be performed on the value states 306. For example, a first operation state 314 (also denoted $SS_1$) can be a marking state where the user interacts to effect marking (e.g., as correct, incorrect, etc.) the attribute in a specific way. A second operation state 316 (also denoted $SS_2$) can be an editing state where the user interacts to effect edits (e.g., as editing, edited, etc.) of the attribute in a specific way. A T-th operation state 318 (also denoted $SS_T$) can be a marking state where the user interacts to effect marking (e.g., as correct, incorrect, etc.) the attribute in a specific way.

The operation states 312 can transition in many different ways, to other states, to the original state 304, and to the value states 306. Some example transitions 320 are shown; however, it is to be understood that these are only examples, and may differ according to the specific implementation of the interactive feedback element 300. The transitions 320 can be accomplished according to gestures (G). That is, a first gesture can be a single tap (single touch of a finger to touch-sensitive display), and a different transition can be accomplished using another gesture of two taps (a double tap). Other transitional gestures can include speech, hand motions, motions using both hands, head motions, face recognition, and so on.

Figure 4:
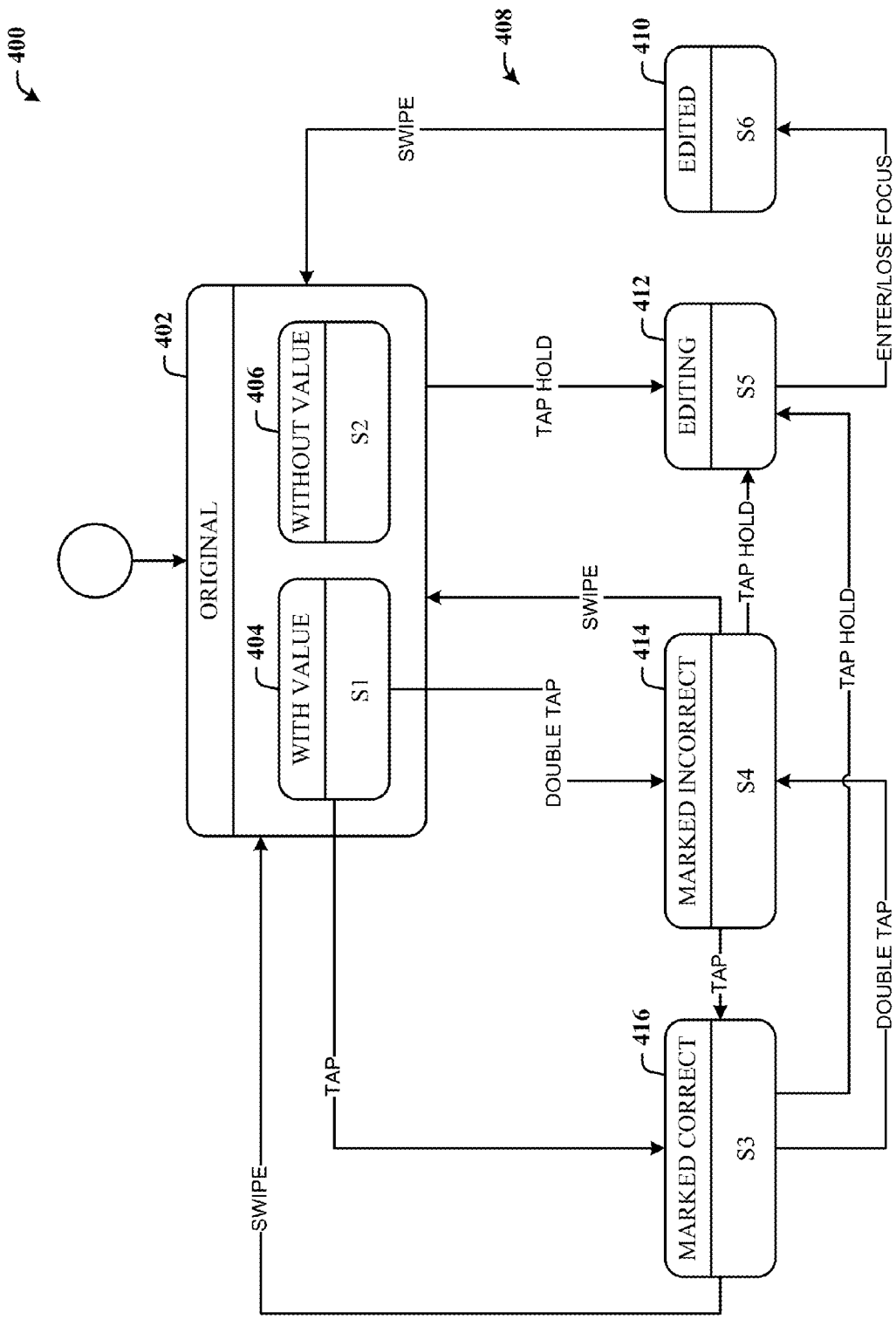
FIG. 4 illustrates a detailed diagram of an exemplary interactive fact feedback element for a state property.

FIG. 4 illustrates a detailed diagram of an exemplary interactive fact feedback element 400 for a state property. An original state 402 comprises two value states: a with-value state 404 (e.g., denoted in code as OriginalValue), and a without-value (or missing value) state 406 (e.g., denoted in code as OriginalMissingValue). Operation states 408 associated with the interactive feedback element 400 include an edited state 410 (e.g., denoted in code as Edited), an editing state 412 (e.g., denoted in code as Editing), a marked incorrect state 414 (e.g., denoted in code as MarkedIncorrect) and a marked correct state 416 (e.g., denoted in code as MarkedCorrect).

Each state has a corresponding visual state which has a clear visual distinction from other states. Moreover, gestures are used to transit from one state to another.

In order to initiate editing of the value in the original state 402, a tap-hold gesture causes transition from either of the original state 402 to the editing state 412. The tap-hold gesture can be a single sustained touch applied to a touch-sensitive display. After editing is completed, the user can transition from the editing state 412 to the edited state 410 using enter and/or lose-focus gesture(s). This can be a single gesture or combination of gestures. For example, the enter gesture (whatever it may be) can indicate an entered value is to be saved. Once the new value has been input (entered), a lose-focus gesture can be made, such as moving a hand horizontally from a forward position in a backward motion, for example, to transition to the edited state 410, indicating that editing has completed. The swipe gesture transitions from the edited state 410 back to the original state 402. The swipe gesture can be the movement of a hand in left-to-right horizontal motion, for example.

If the user chooses to simply mark the value as incorrect, the user transitions from the with-value state 404 to the marked-incorrect state 414. Transition from the with-value state 404 to the marked incorrect state 414 can be accomplished using a double-tap gesture. The double-tap gesture can be defined as two consecutive single touches on a touch-sensitive display. This indicates the original value of the attribute may be incorrect and the user wants to change the value.

From the marked-incorrect state 414, the user can transition to different states (e.g., editing 412, original state 402, or marked-correct state 416) using corresponding gestures. For example, the user can simply mark the value as incorrect and then transition back to the original state 402 using the swipe gesture. Alternatively, the user can enter editing mode by transitioning to the editing state 412 using the tap-and-hold gesture, and then changing the value. Still alternatively, the user can transition to the marked-correct state 416 using a single tap (touch) gesture. This transition accommodates the situation where the user may have accidentally intended to mark the attribute as incorrect, when it was actually correct.

From the with-value state 404, the user can transition to the marked-correct state 416 using a single tap gesture to provide feedback that the current attribute value is correct. After marking the attribute as correct, transition back to the original state 402 can be accomplished using the swipe gesture. Alternatively, the user can transition from the marked-correct state 416 to the marked-incorrect state 414 using the double tap gesture. Still alternatively, transition can be from the marked-correct state 416 to the editing state 412 using the tap-and-hold gesture.

It is apparent that gestures can be duplicated for certain transitions to make it easier for the user. For example, the swipe gesture returns to the original state 402, the tap-and-hold gesture enters the editing mode from any state, the single-tap gesture enters the marked-correct state 416, and the double-tap gesture enters the marked-incorrect state 414.

Figure 5:
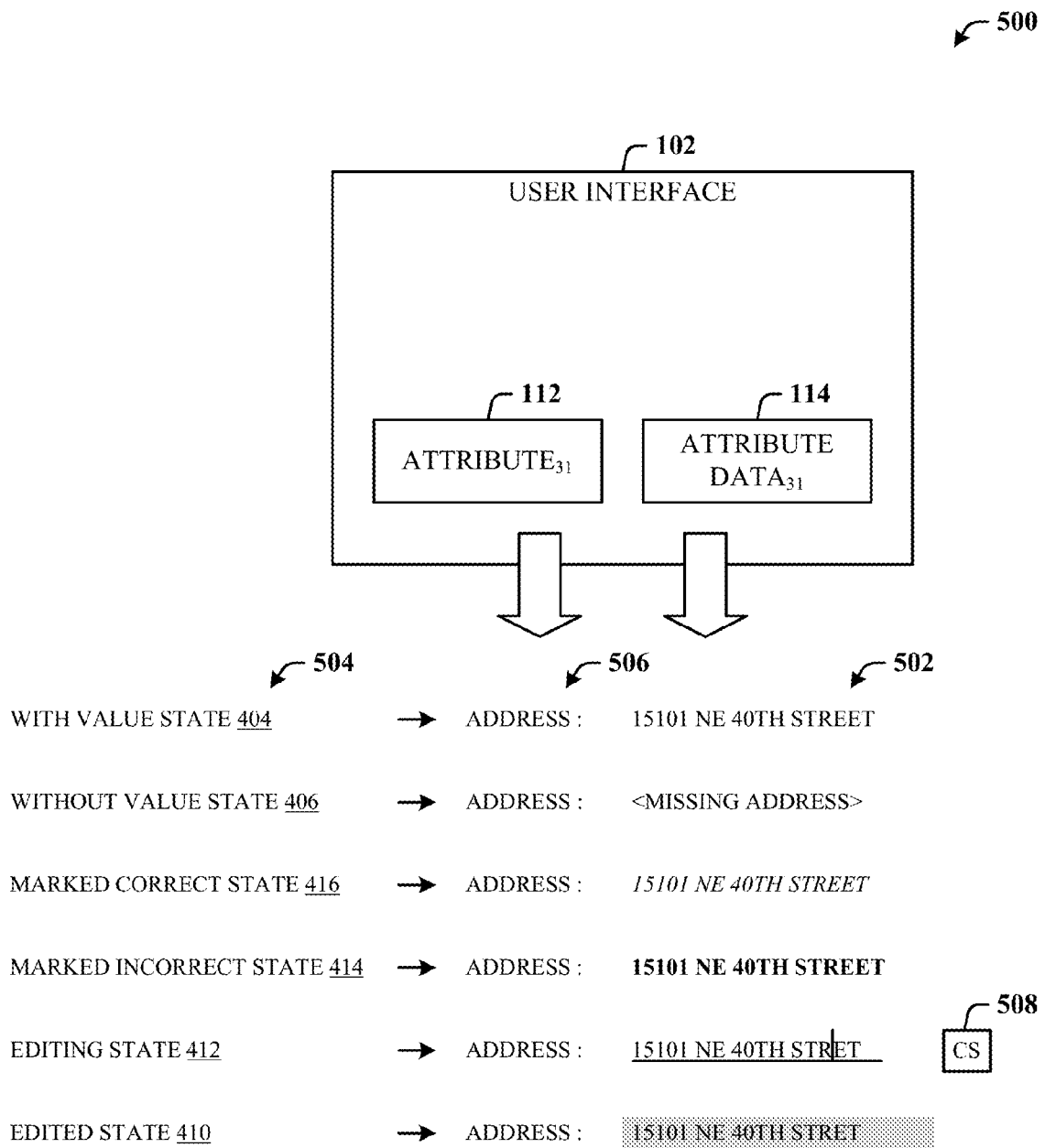
FIG. 5 illustrates a presentation of the different visual states in the user interface for feedback element states of an attribute.

FIG. 5 illustrates a presentation 500 of the different visual states 502 in the user interface 102 for feedback element states 504 of an attribute 506. The user interface 102 presents multiple attributes and attribute data as web and/or structured data. Here, the attribute 112 has attribute data (value) 114. The attribute is "address" and the attribute value is "15101 NE 40$^{th}$ Street". The different states illustrated follow the states for the state property of the feedback element 400 of FIG. 4. Accordingly, the with-value state 404 for "address" is the visual state "15101 NE 40$^{th}$ Street". If the "address" is missing, the without-value state 406 can be presented as the visual state "<missing address>".

If the user chooses to mark the address as correct, transition is to the marked-correct state 416 and the visual state can be presented as an italicized address "*15101 NE 40$^{th}$ Street*" to show the address has been marked as correct. If the user chooses to mark the address as incorrect, transition is to the marked-incorrect state 414 and the visual state of the attribute value can be presented as a bolded italicized address "*15101 NE 40$^{th}$ Street*" to show the address has been marked as incorrect.

If the user chooses to edit the value, transition is to the editing state 412 and the visual state of the attribute value can be presented as the address as underlined "15101NE40$^{th}$|Street" with a vertical line in the text field to represent a cursor that can be moved into position to add or remove characters, text, change font, highlight, style, etc. Here, the user removes a letter "e" in the word "street" while in the editing mode. If the user chooses to save the editing, transition is to the edited state 410 and the visual state of the attribute value can be presented as the edited address "15101 NE 40$^{th}$ Stret" with a grayed background of the text field to show the address has been edited.

The visual state presented here are only a few examples of the graphical emphasis (e.g., bolding, annotation, indicator, italicization, background colorization, etc.) that can be utilized to visually represent the various states. Item 508 is described in association with the description of FIG. 6A and FIG. 6B. Accordingly, the visual states shown are not to be construed as limited to these examples, in that text coloring can be employed for the different visual states, font size can be employed, and so on.

Figure 6A:
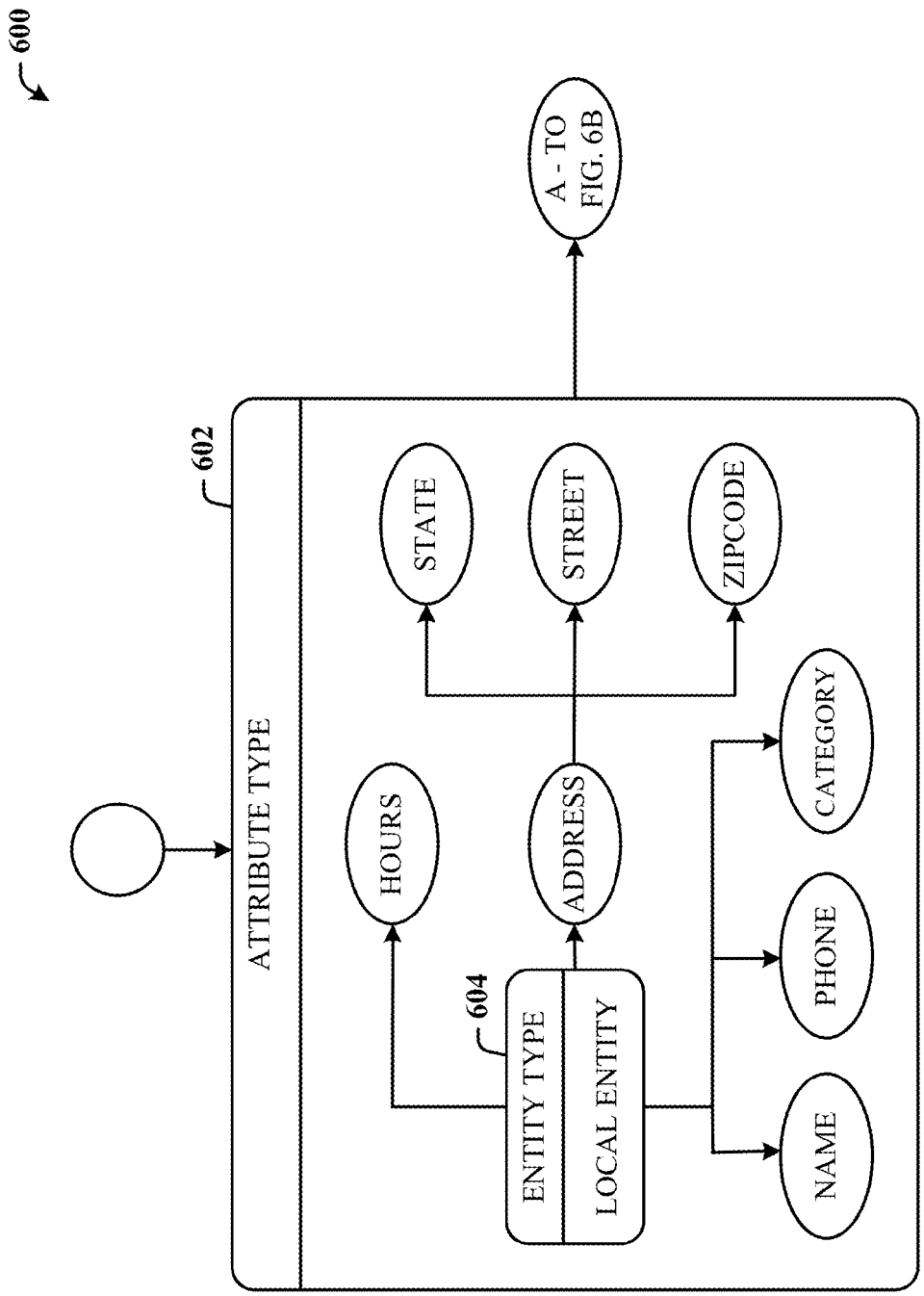
FIG. 6A and FIG. 6B illustrate a single diagram of feedback user interface elements that includes a container item for Attribute Type property, Suggested Value property and the Original Value property.
Figure 6B:
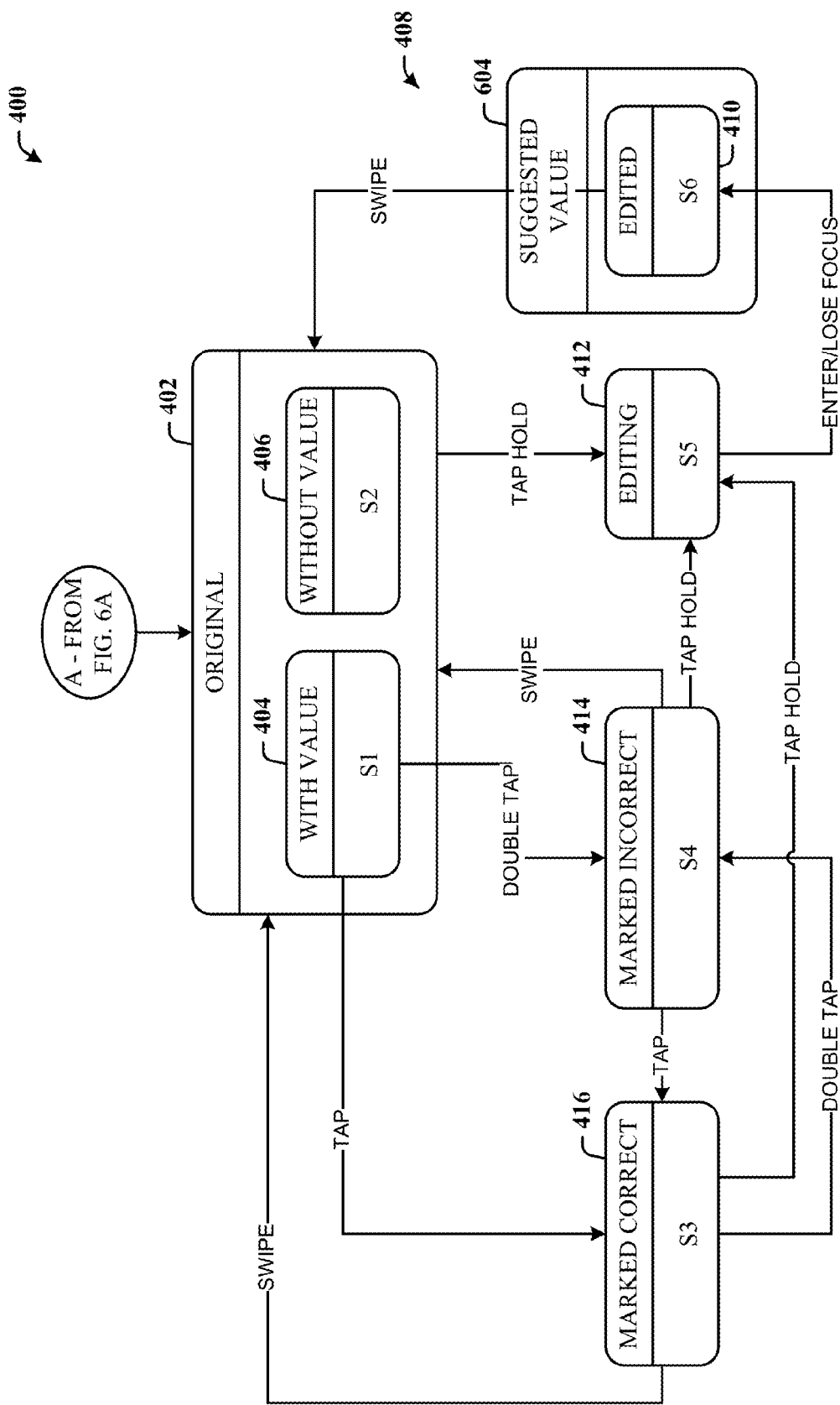

FIG. 6A and FIG. 6B illustrate a single diagram 600 of feedback user interface elements that includes a container item for Attribute Type property 602, Suggested Value 604 property and the Original Value property 402. In FIG. 6A, the Attribute Type property 602 comprises an entity type 604 with attributes related to hours, address (state, street, postal code ("zipcode")), as well as name, phone, and category.

The attribute Type property relates to the Original value property 402, as shown in FIG. 6B. Most of the items of FIG. 6B have been described previously in FIG. 4; however, the Suggested Value property 604 is now shown in association with the edited state 410. The Suggested Value property 604 (container) is associated with the edited state, which when reaching this state indicates to the system that this is a suggested value. However, it is within contemplation of the disclosed architecture that a container (e.g., Externally Suggested Value property) can be implemented with the editing state 412 to receive externally suggested edit(s), such as from crowd-source sources. If the user agrees, or accepts the suggested edit(s), the enter/lose focus gesture is affirmation that the user agrees, since state moves to the edited state 410, and hence, becomes the suggested value. Similar types of containers can be implemented for external input (e.g., crowd-sourced) to the marked correct state 416 and marked incorrect state 414, for example.

In coordination with this external suggestion input capability, states of the different visual states 502 of FIG. 5 can be annotated or tagged with an indicator 508 (CS for crowd-sourced, or ES for externally sourced, etc.) to indicate at least to the user that the content is externally sourced. For example, continuing with the inclusion of an Externally Suggested Value property container for the editing state 412, a graphic or icon (or some other visual/audio notification technique) can be presented (e.g., proximate to the address field) that clearly indicates to the user that the text was received as suggested from an external source. Alternatively, the graphical emphasis employed can include one that clearly indicates to the user that the text (or content) was received (or influenced) by one or more external sources.

Figure 7:
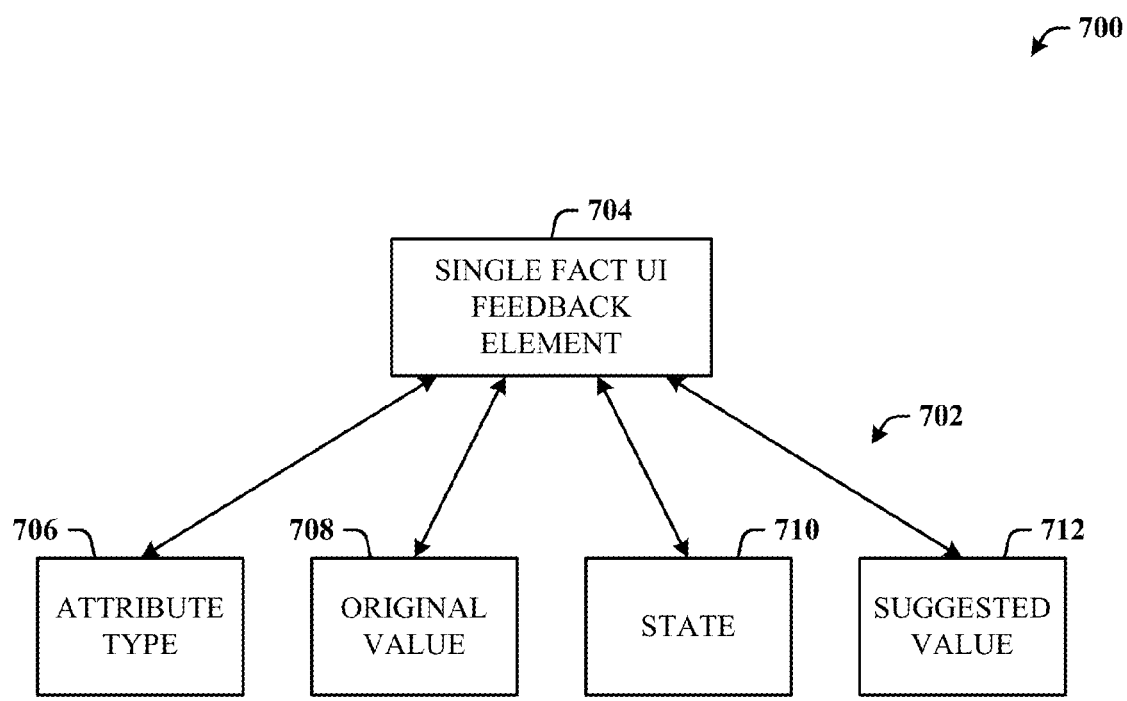
FIG. 7 illustrates a diagram of the properties of the single fact UI feedback element.

FIG. 7 illustrates a diagram 700 of the properties 702 of the single fact UI feedback element 704. In addition to standard UI element properties, the single fact UI feedback element 704 (e.g., the interactive feedback element 300 of FIG. 3) defines (at least) the additional properties: attribute type 706 (e.g., denoted in code as AttributeType), original value 708 (e.g., denoted in code as OriginalValue), state 710 (e.g., denoted in code as State), and suggested value 712 (e.g., denoted in code as SuggestedValue). The states of the State property (as illustrated in FIG. 3 and FIG. 4) can be one of original with-value, original missing-value (also referred to as without-value), marked correct, marked incorrect, editing, and edited. Each state has a corresponding visual state (as shown in FIG. 5, and FIGS. 6A and 6B) that when displayed in the UI provides a clear visual distinction from other states. Gestures can be used to transit from one state to another state.

Figure 8:
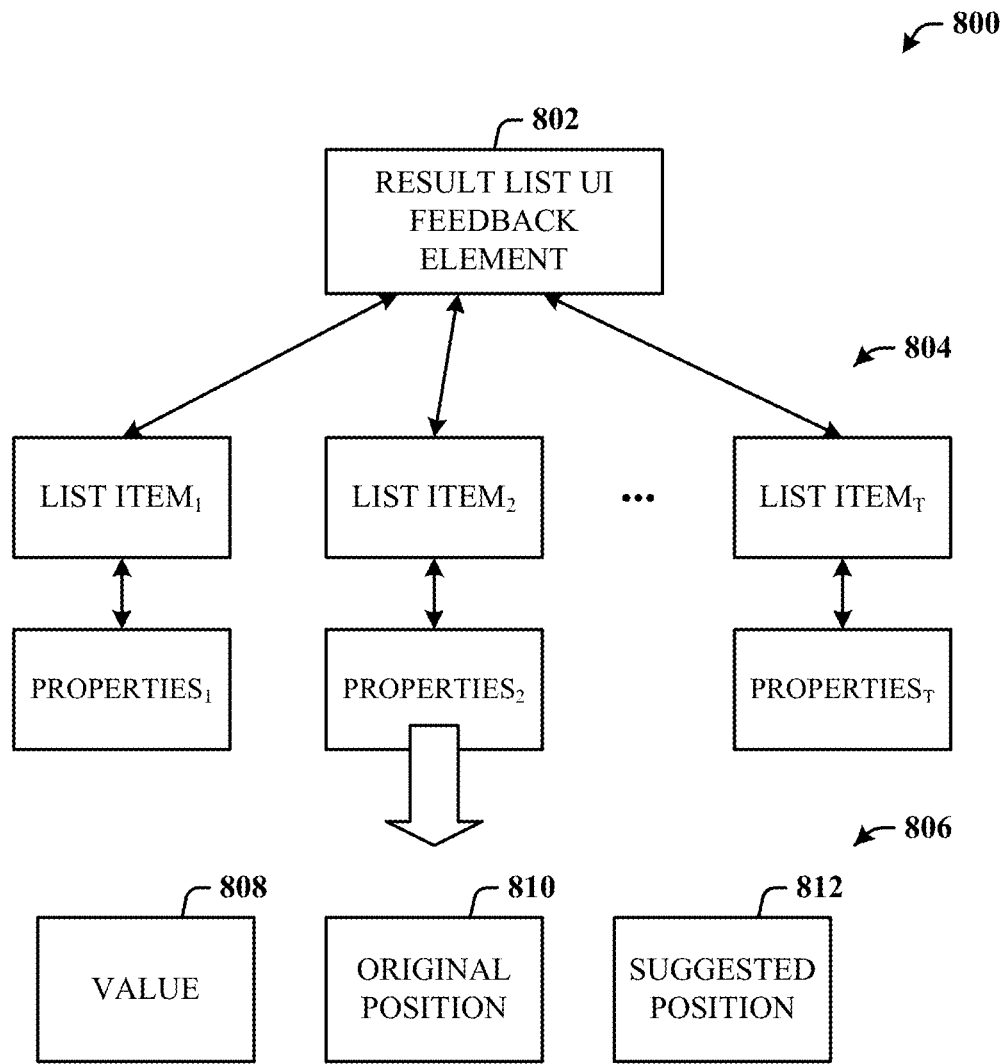
FIG. 8 illustrates a diagram of a result list feedback element in accordance with the disclosed architecture.

FIG. 8 illustrates a diagram 800 of a result list feedback element 802 in accordance with the disclosed architecture. The result list feedback element 802 includes a collection of list items 804. Each of the list items 804 has at least the following properties 806: value 808 (e.g., denoted in code as Value), original position 810 (e.g., denoted in code as OriginalPosition), and suggested position 812 (e.g., denoted in code as SuggestedPosition).

A position value is used for items not in the list (OriginalPosition for a new item and SuggestedPosition for a deleted item). Dragging an item to a desired location in the list of items 804 results in updating the SuggestedPosition property of the items with SuggestPosition value between the "from" location and the "to" location. Snapping items together (using a pose/voice gesture that is interpreted to bring two list items together) results in the items having the same SuggestedPosition and updates the SuggestedPosition of the affected items. Zooming-out on an item gives adjacent new SuggestedPosition values to the items at the current SuggestePosition. Zooming-out on two adjacent items inserts a new item, and repositions items below. Wiping (a wiping gesture) on a non-deleted item results in a visual change (e.g., moved to the bottom of the list and crossed through) to reflect the item is deleted. Wiping on a deleted item reverses the "delete" effects by visually changing the item back to the normal style and moving the item to the bottom of non-deleted items list.

Figure 9:
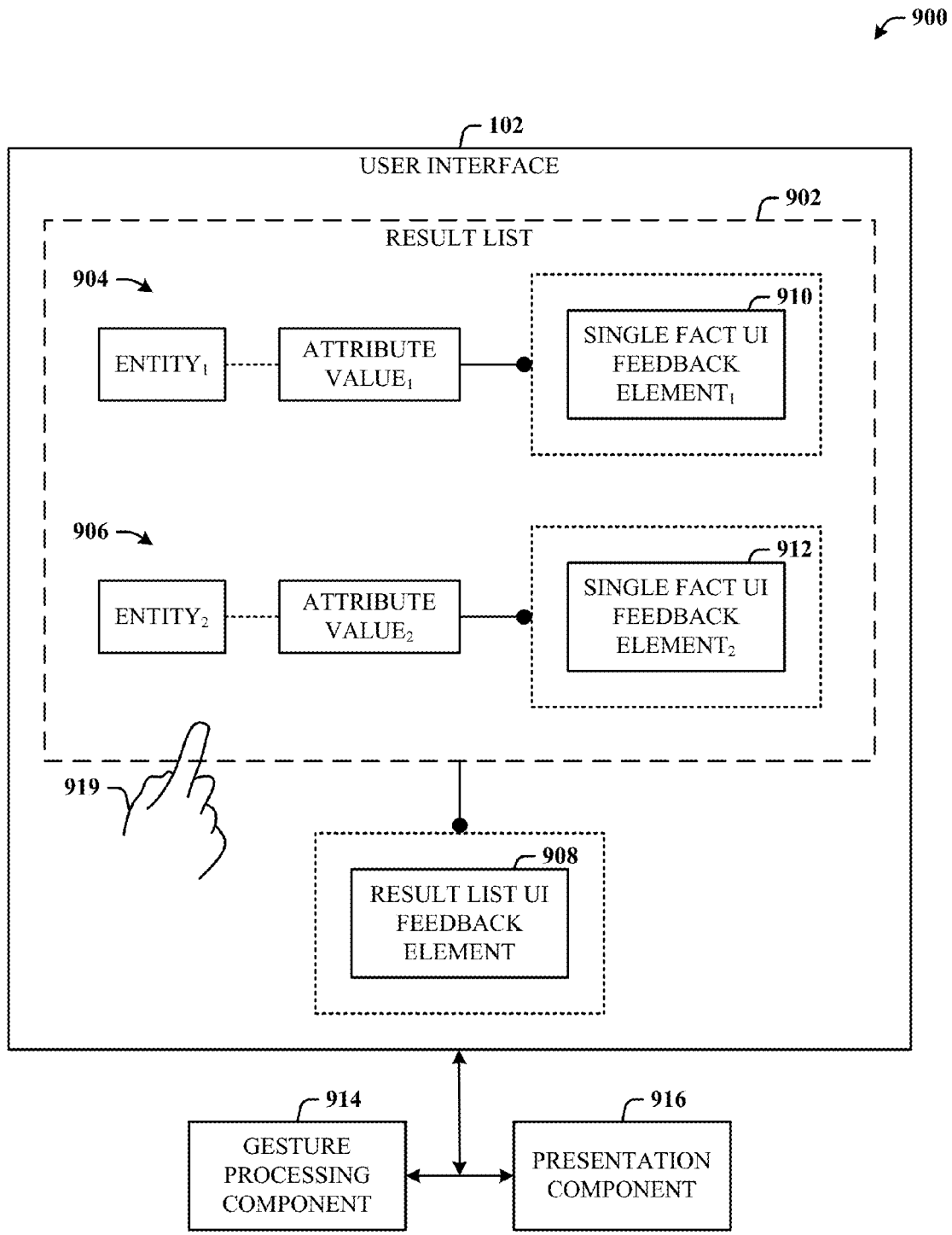
FIG. 9 illustrates a user interface system that employs gestures to interact with attributes, entities, and lists of entities and attributes in accordance with the disclosed architecture.

FIG. 9 illustrates a user interface system 900 that employs gestures to interact with attributes, entities, and lists of entities and attributes in accordance with the disclosed architecture. The UI 102 shows a result list 902 of web and/or structured data to which a user will provide feedback. The list 902 includes two entity/attribute pairs: a first entity/attribute pair 904 and a second entity/attribute pair 906. However, it is to be appreciated that the list 902 can include many more entities and entity attributes than depicted.

The list 902 is associated with a result list UI feedback element 908 (similar to the element 802 of FIG. 8). The dotted line, in all instances of the system 900, indicates that the associated items are not visual, but coded. The dashed line about the result list 902 and the dotted line of the list element 908 indicate a programmed relationship. Thus, the list element 908 functions in association with the entity/attribute pairs (904 and 906) to enable the capabilities described in association with FIG. 8.

Similarly, entity/attribute pairs have associated single fact elements: the first pair 904 is associated with a first single fact feedback element 910 and the second pair 906 is associated with a second single fact feedback element 912. The single fact feedback elements (910 and 912) enable all the functionality described at least in association with FIGS. 1-8, and elsewhere for gesture interactions with entities and attributes.

The system 900 also comprises a gesture processing component 914 (e.g., algorithm) and a presentation component 916. The presentation component 916 can include the hardware and software typically provided and enabled for user interaction with touch-sensitive displays and application user interfaces. The gesture processing component 914 comprises the hardware and software capabilities at least for speech recognition, voice recognition, face recognition, pose recognition for body part and appendages. Thus a single-handed gesture using a hand 919 can be interpreted to affect list and attribute interactions at least as described herein. It is to be appreciated that as previously indicated, the gestures can include both hands, eye movement, voice commands, etc., to create the desired effect configured and understood by the architecture.

Thus, presenting a drag gesture to perform a drag operation on an item to a desired location results in updating the suggested position property of the items with the suggest position value between the "from" location and the "to" location in the list. Snapping items together makes the items have the same suggested position and updates the SuggestedPosition value of the affected items. Zooming-out on a single item assigns/updates adjacent new SuggestedPosition values to the items at the current SuggestedPosition. Zooming-out on two adjacent items inserts a new item, and repositions items below. Wiping (a wiping gesture such as moving a hand horizontally left-right) on a non-deleted item results in a visual change (e.g., moved to the bottom of the list and crossed through) to reflect the item is deleted. Wiping on a deleted item reverses the "delete" effects by visually changing the item back to the normal style and moving the item to the bottom of non-deleted items list.

Figure 10:
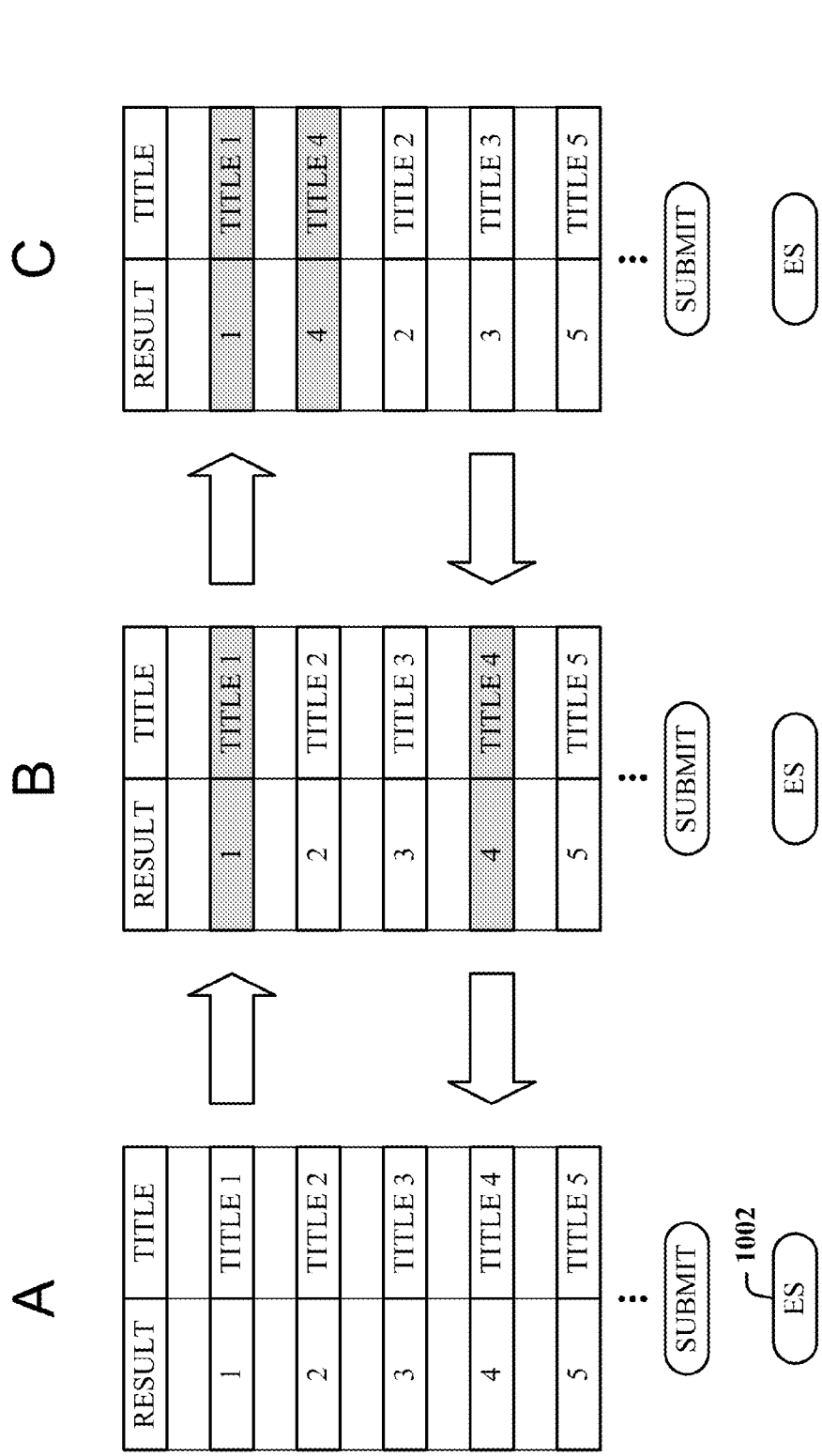
FIG. 10 illustrates a diagram for interacting with a result set list as facilitated by the feedback user interface element of FIG. 8.

FIG. 10 illustrates a diagram 1000 for interacting with a result set list as facilitated by the feedback user interface element 802 of FIG. 8. The diagram 1000 illustrates one example of gestures for indicating duplicate result set list items and then undoing the selection of duplicate list items. As presented to the user, after performing a search that returns the list of result items, the initial state A of the result set items shows five results and corresponding result titles (of which there can be more than the five results listed, such as ten, for example). Moving left-to-right, in state B, the user has applied a two-touch-finger gesture to tap-and-hold in contact with two selections from the result set: the first result and the fourth result. The user then gestures by moving the fingers together in a "pinching" motion, which is interpreted to indicate to bring the two results together in a combined record. This is represented in state C, where the fourth result is moved up the list just under the first result (a SuggestedPosition), and the result list now shows the second result continuing to be listed as the second result (rather than being renumbered), and so on, for the remaining results in the list. The user can then interact with (e.g., tap) the Submit button to send the suggested listing to the search engine.

The reverse (or undo) operation can also be performed. Beginning at state C, the user applies a gesture (e.g., touch and drag apart) that is interpreted by the system to separate the combined record items of the first result and the fourth result (as indicated in state B). This action of separating both items automatically returns the result items to original positions (the first result remaining in the first position, and the fourth result returning to the fourth position), thereby reverting to the starting state A of being unselected.

As described in FIGS. 6A and 6B, externally-sourced (ES) suggestions can be implemented, optionally, with the list feedback UI element as well. Here, beginning in state A, an ES button 1002 is provided that, when selected (using a gesture), automatically applies graphical emphasis to one or more list items that are suggested (by external sources such as crowd-sourced data) to be repositioned or combined in the result set. The user can then choose to retain the ES suggestion, or deselect the ES button 1002 (using a gesture) to revert back to the previous state as indicated in state A, and move forward to state B using gestured-enabled selection, combining, reverting, etc.

Figure 11:
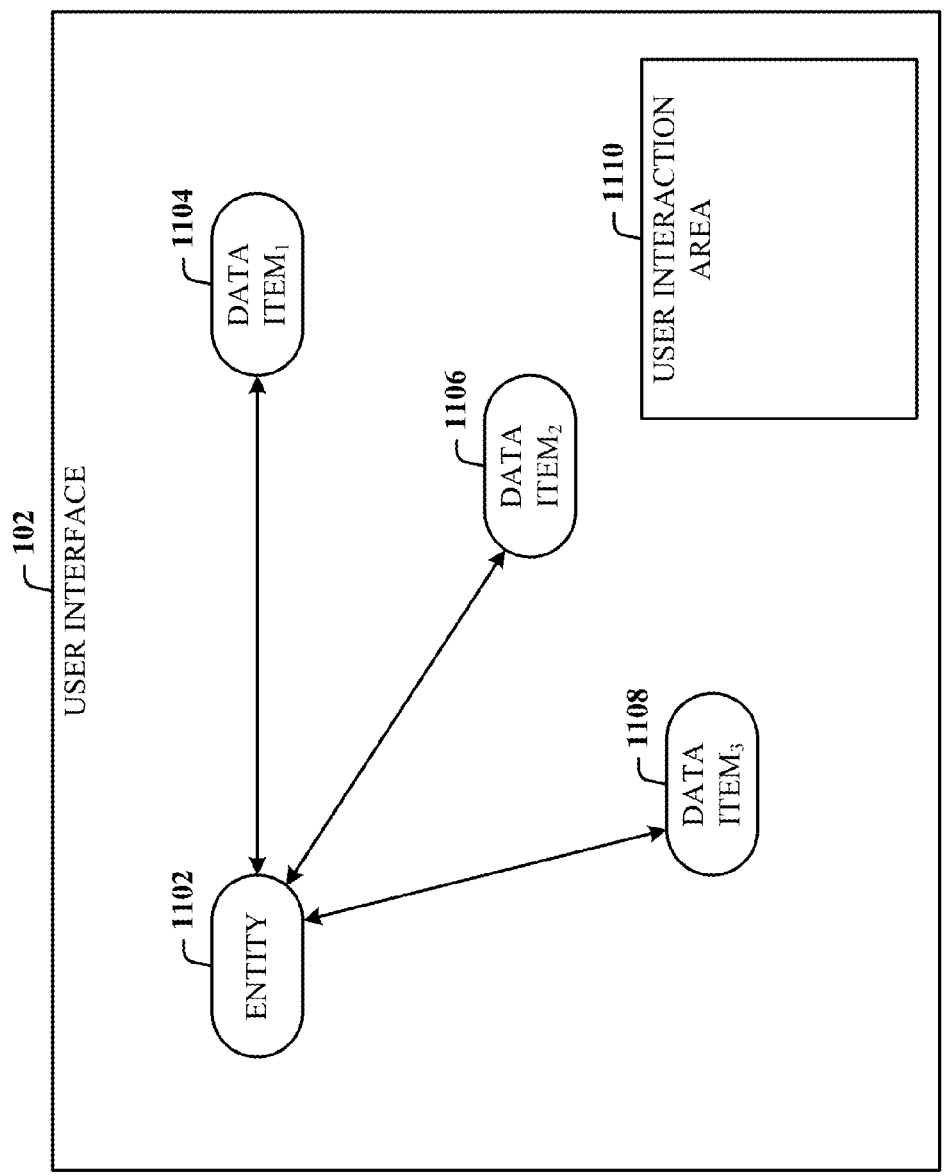
FIG. 11 illustrates implementation of the disclosed architecture for entity disambiguation in an entity graph.

FIG. 11 illustrates implementation of the disclosed architecture for entity disambiguation in an entity graph 1100. Ambiguity arises based on variations on how the entity is referenced, with entities having the same name, and by misspellings, in web documents, for example.

Thus, the disclosed architecture can be employed for interacting with (e.g., entering, correcting, etc.) entity data where the known relationships among the data items are utilized to flag missing or incorrect entries. For example, the entity "Lincoln" can have very different sets of entity data items and graph relations among the data depending on the specific entity (e.g., the president, the car, the movie, the city, etc.).

Consider the simplified and generalized entity graph 1100 of UI objects as one entity 1102 and three entity data items: a first data item 1104, a second entity data item 1106, and a third entity data item 1108, each having a relationship denoted by an arrow to the entity 1102.

Each of the objects can have associated therewith UI feedback elements as described herein to facilitate gesture-enabled user feedback at least in terms of marking correct/incorrect, editing/edited, with/without values, list positioning, etc., as to the entity objects (e.g., Entity 1102), data item objects (e.g., data item 1106), and the relationship objects (arrows) for disambiguation. Not only can the user employ gestures to provide feedback for each of the objects, but also to move between the objects in the user interface 102. For example, a swipe gesture can be used to move to another object (as determined by the system), in which case, any data for the moved-to object is presented in a user interaction area 1110. The user can then use the gestures for the UI elements for the interaction to edit, mark as correct, and so on.

As before, suggested edits (or content) can be received into the user interface 102 as obtained from external sources (e.g., crowd-sourced). Graphical emphasis can be provided proximate the object (e.g., ES), to the object, for example, or in the interaction area 1110 for a specific object to indicate that suggested information is available for this object.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 12:
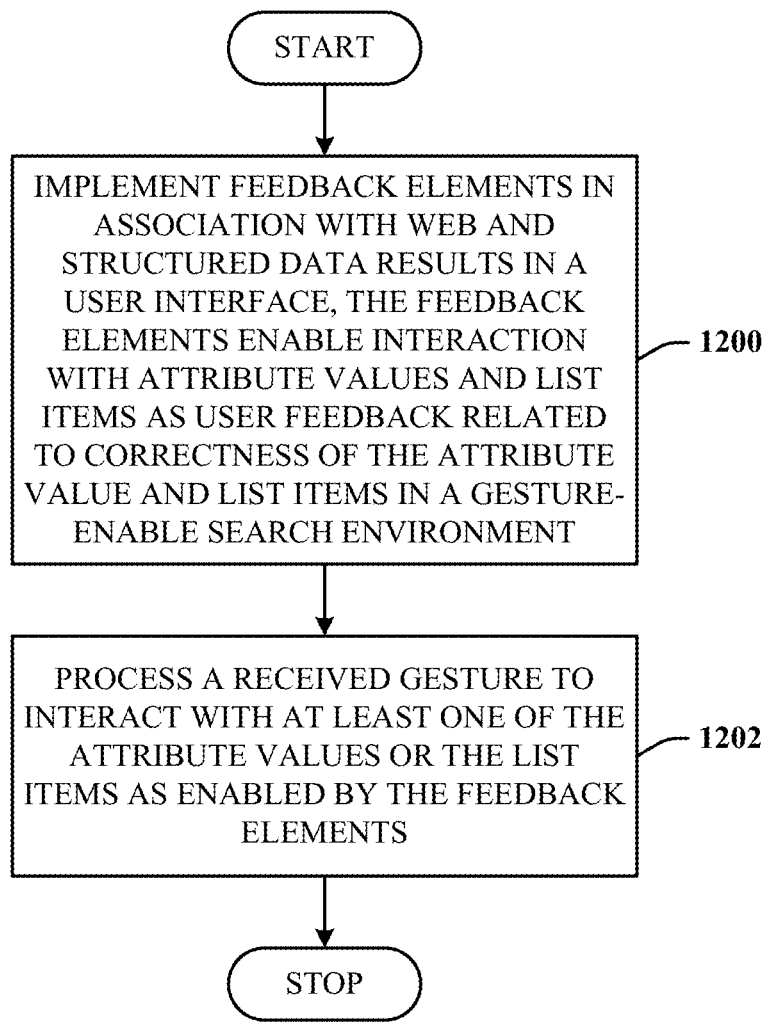
FIG. 12 illustrates a method in accordance with the disclosed architecture.

FIG. 12 illustrates a method in accordance with the disclosed architecture. At 1200, feedback elements (fact interactive element(s) and list interactive element(s)) are implemented in association with web and structured data results in a user interface. The feedback elements enable interaction with attribute values and list items as user feedback related to correctness of the attribute value and list items in a gestured-enable search environment, for example. At 1202, a received gesture is processed to interact with at least one of the attribute values or the list items as enabled by the feedback elements. A microprocessor can be configured to execute instructions stored in a memory, the instructions associated with at least one of the acts of implementing or processing.

The method can further comprise accessing data sources related to other user inputted attribute values and presenting the other user inputted attribute values as part of the list items. The method can further comprise providing a list feedback element of the feedback elements that enables feedback on an ordered list with respect to addition of entries, relevance, and removal of duplicate entries using corresponding gestures. The method can further comprise implementing a (single) fact feedback element as one of the feedback elements that enables different visual states related to value operations.

The method can further comprise defining properties with and gestures for a fact feedback element (e.g., single) related to attribute type, original value of the attribute, state, and suggested value. The method can further comprise defining properties with and gestures for a result list feedback element related to value of a list item, original position of a list item, and suggested position of a list item. The method can further comprise presenting realtime data from other users (e.g., social network user, crowd-sourced users, etc.) in response to a gesture, and enabling selection of the realtime data.

Figure 13:
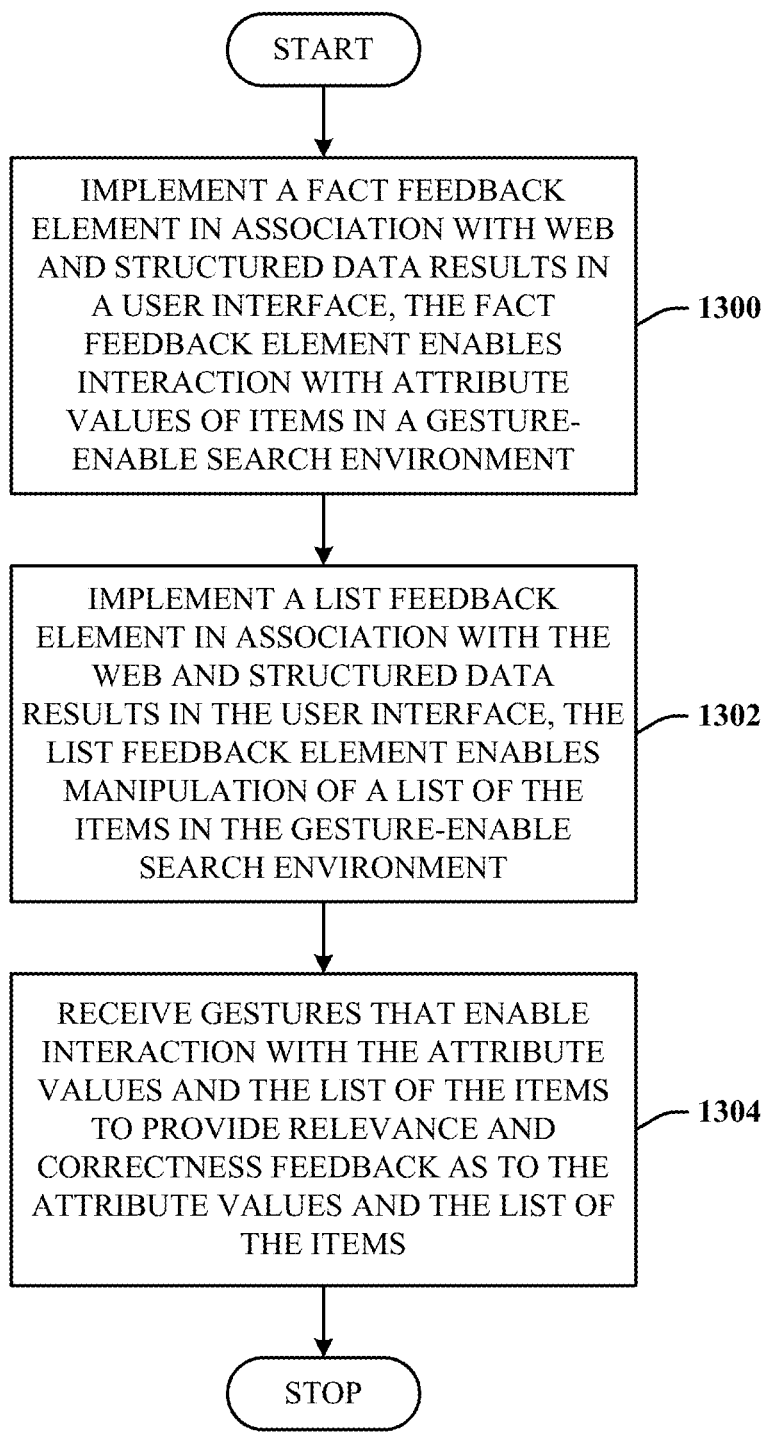
FIG. 13 illustrates an alternative method in accordance with the disclosed architecture.

FIG. 13 illustrates an alternative method in accordance with the disclosed architecture. At 1300, a fact feedback element is implemented in association with web and structured data results in a user interface, the fact feedback element enables interaction with attribute values of items in a gesture-enabled search environment. At 1302, a list feedback element can be implemented in association with the web and structured data results in the user interface, the list feedback element enables manipulation of a list of the items in the gesture-enabled search environment. At 1304, gestures are received that enable interaction with the attribute values and the list of the items to provide relevance and correctness feedback as to the attribute values and the list of the items. A microprocessor can be configured to execute instructions in a memory associated with at least one of the acts of implementing the fact feedback element, implementing the list feedback element, or receiving.

The method can further comprise suggesting and presenting the list of items based on crowd-sourced data and social network data. The method can further comprise receiving gestures that transit states to mark and edit values, remove duplicate items of the list, add items to the list, and reposition items on the list. The method can further comprise visually differentiating in a user interface between operations associated with the fact feedback element and operations associated with the list feedback element. The method can further comprise receiving gestures that enable feedback related to relevance and correctness of non-text content (e.g., images, video, audio, links, etc.).

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, a data structure (stored in a volatile or a non-volatile storage medium), a module, a thread of execution, and/or a program.

By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 14:
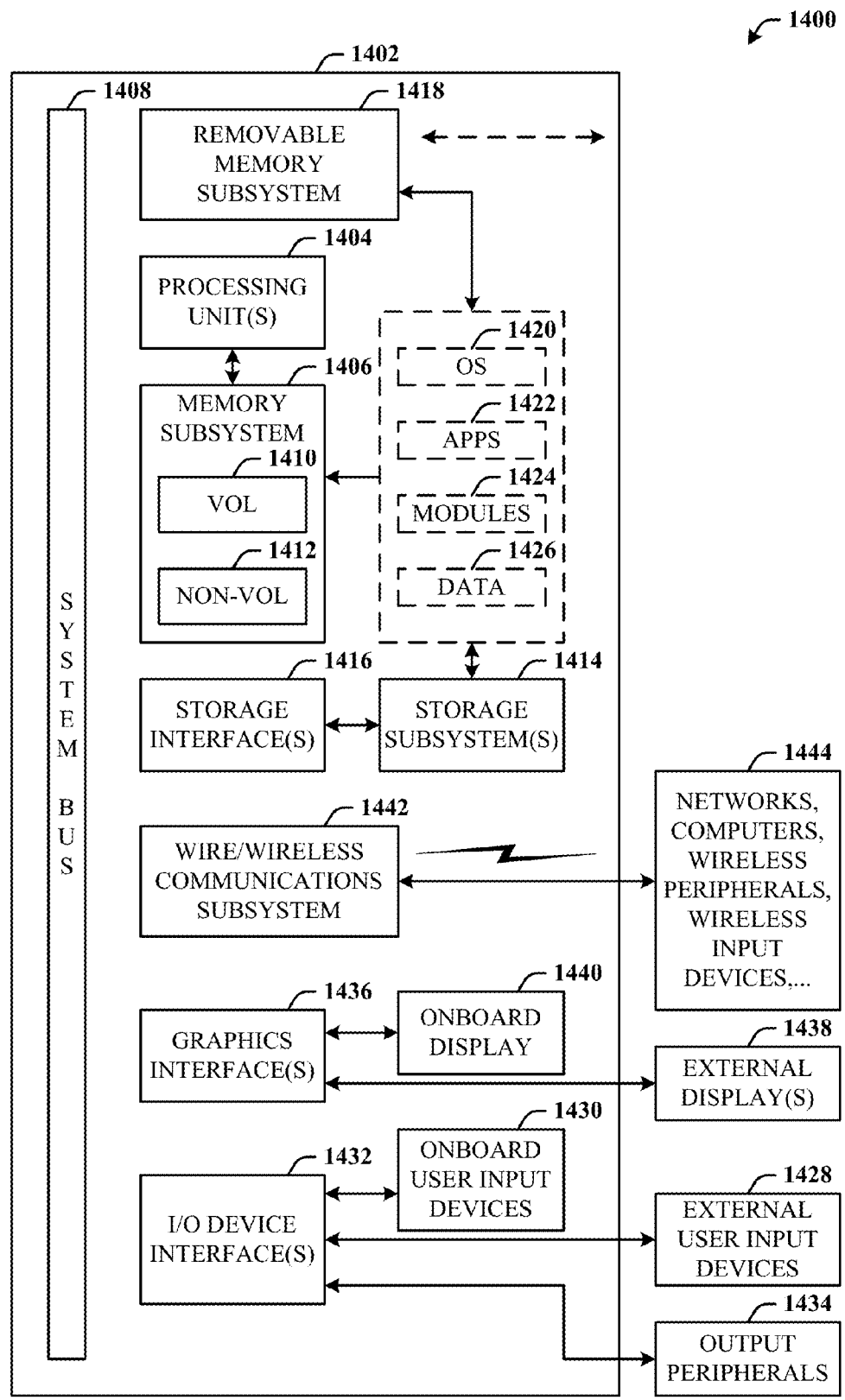
FIG. 14 illustrates a block diagram of a computing system that employs and executes interactive elements in accordance with the disclosed architecture.

Referring now to FIG. 14, there is illustrated a block diagram of a computing system 1400 that employs and executes interactive elements in accordance with the disclosed architecture. However, it is appreciated that the some or all aspects of the disclosed methods and/or systems can be implemented as a system-on-a-chip, where analog, digital, mixed signals, and other functions are fabricated on a single chip substrate.

In order to provide additional context for various aspects thereof, FIG. 14 and the following description are intended to provide a brief, general description of the suitable computing system 1400 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 1400 for implementing various aspects includes the computer 1402 having processing unit(s) 1404 (also referred to as microprocessor(s) and processor(s)), a computer-readable storage medium such as a system memory 1406 (computer readable storage medium/media also include magnetic disks, optical disks, solid state drives, external memory systems, and flash memory drives), and a system bus 1408. The processing unit(s) 1404 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, tablet PC, etc.), hand-held computing devices, microprocessor-based or programmable consumer electronics, and the like, each of which can be operatively coupled to one or more associated devices.

The computer 1402 can be one of several computers employed in a datacenter and/or computing resources (hardware and/or software) in support of cloud computing services for portable and/or mobile computing systems such as cellular telephones and other mobile-capable devices. Cloud computing services, include, but are not limited to, infrastructure as a service, platform as a service, software as a service, storage as a service, desktop as a service, data as a service, security as a service, and APIs (application program interfaces) as a service, for example.

The system memory 1406 can include computer-readable storage (physical storage) medium such as a volatile (VOL) memory 1410 (e.g., random access memory (RAM)) and a non-volatile memory (NON-VOL) 1412 (e.g., ROM, EPROM, EEPROM, etc.). A basic input/output system (BIOS) can be stored in the non-volatile memory 1412, and includes the basic routines that facilitate the communication of data and signals between components within the computer 1402, such as during startup. The volatile memory 1410 can also include a high-speed RAM such as static RAM for caching data.

The system bus 1408 provides an interface for system components including, but not limited to, the system memory 1406 to the processing unit(s) 1404. The system bus 1408 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 1402 further includes machine readable storage subsystem(s) 1414 and storage interface(s) 1416 for interfacing the storage subsystem(s) 1414 to the system bus 1408 and other desired computer components. The storage subsystem(s) 1414 (physical storage media) can include one or more of a hard disk drive (HDD), a magnetic floppy disk drive (FDD), solid state drive (SSD), and/or optical disk storage drive (e.g., a CD-ROM drive DVD drive), for example. The storage interface(s) 1416 can include interface technologies such as EIDE, ATA, SATA, and IEEE 1394, for example.

One or more programs and data can be stored in the memory subsystem 1406, a machine readable and removable memory subsystem 1418 (e.g., flash drive form factor technology), and/or the storage subsystem(s) 1414 (e.g., optical, magnetic, solid state), including an operating system 1420, one or more application programs 1422, other program modules 1424, and program data 1426.

The operating system 1420, one or more application programs 1422, other program modules 1424, and/or program data 1426 can include entities and components of the system 100 of FIG. 1, entities and components of the system 200 of FIG. 2, entities and components of the element 300 of FIG. 3, entities and components of the element 400 of FIG. 4, entities and components of the presentation 500 of FIG. 5, entities and components of the diagram 600 of FIGS. 6A and 6B, entities and components of the diagram 700 of FIG. 7, entities and components of the diagram 800 of FIG. 8, entities and components of the UI system 900 of FIG. 9, entities and components of the diagram 1000 of FIG. 10, entities and components related to the entity graph 1100 of FIG. 11, and the methods represented by the flowcharts of FIGS. 12 and 13, for example.

Generally, programs include routines, methods, data structures, other software components, etc., that perform particular tasks or implement particular abstract data types. All or portions of the operating system 1420, applications 1422, modules 1424, and/or data 1426 can also be cached in memory such as the volatile memory 1410, for example. It is to be appreciated that the disclosed architecture can be implemented with various commercially available operating systems or combinations of operating systems (e.g., as virtual machines).

The storage subsystem(s) 1414 and memory subsystems (1406 and 1418) serve as computer readable media for volatile and non-volatile storage of data, data structures, computer-executable instructions, and so forth. Such instructions, when executed by a computer or other machine, can cause the computer or other machine to perform one or more acts of a method. The instructions to perform the acts can be stored on one medium, or could be stored across multiple media, so that the instructions appear collectively on the one or more computer-readable storage medium/media, regardless of whether all of the instructions are on the same media.

Computer readable storage media (medium) exclude (excludes) propagated signals per se, can be accessed by the computer 1402, and include volatile and non-volatile internal and/or external media that is removable and/or non-removable. For the computer 1402, the various types of storage media accommodate the storage of data in any suitable digital format. It should be appreciated by those skilled in the art that other types of computer readable medium can be employed such as zip drives, solid state drives, magnetic tape, flash memory cards, flash drives, cartridges, and the like, for storing computer executable instructions for performing the novel methods (acts) of the disclosed architecture.

A user can interact with the computer 1402, programs, and data using external user input devices 1428 such as a keyboard and a mouse, as well as by voice commands facilitated by speech recognition. Other external user input devices 1428 can include a microphone, an IR (infrared) remote control, a joystick, a game pad, camera recognition systems, a stylus pen, touch screen, gesture systems (e.g., eye movement, head movement, etc.), and/or the like. The user can interact with the computer 1402, programs, and data using onboard user input devices 1430 such a touchpad, microphone, keyboard, etc., where the computer 1402 is a portable computer, for example.

These and other input devices are connected to the processing unit(s) 1404 through input/output (I/O) device interface(s) 1432 via the system bus 1408, but can be connected by other interfaces such as a parallel port, IEEE 1394 serial port, a game port, a USB port, an IR interface, short-range wireless (e.g., Bluetooth) and other personal area network (PAN) technologies, etc. The I/O device interface(s) 1432 also facilitate the use of output peripherals 1434 such as printers, audio devices, camera devices, and so on, such as a sound card and/or onboard audio processing capability.

One or more graphics interface(s) 1436 (also commonly referred to as a graphics processing unit (GPU)) provide graphics and video signals between the computer 1402 and external display(s) 1438 (e.g., LCD, plasma) and/or onboard displays 1440 (e.g., for portable computer). The graphics interface(s) 1436 can also be manufactured as part of the computer system board.

The computer 1402 can operate in a networked environment (e.g., IP-based) using logical connections via a wired/wireless communications subsystem 1442 to one or more networks and/or other computers. The other computers can include workstations, servers, routers, personal computers, microprocessor-based entertainment appliances, peer devices or other common network nodes, and typically include many or all of the elements described relative to the computer 1402. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 1402 connects to the network via a wired/wireless communication subsystem 1442 (e.g., a network interface adapter, onboard transceiver subsystem, etc.) to communicate with wired/wireless networks, wired/wireless printers, wired/wireless input devices 1444, and so on. The computer 1402 can include a modem or other means for establishing communications over the network. In a networked environment, programs and data relative to the computer 1402 can be stored in the remote memory/storage device, as is associated with a distributed system. It will be appreciated that the network connections shown are exemplary and other means of establishing a communications link between the computers can be used.

The computer 1402 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi™ (used to certify the interoperability of wireless computer networking devices) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related technology and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a user interface that presents structured data, the structured data includes data items defined according to entities and corresponding entity attributes, and for which user feedback is desired in a gestured-enabled search environment;
   an interactive element associated with an attribute, the interactive element enables user interaction with attribute data of the attribute to provide feedback as to correctness of the attribute data; and
   a microprocessor that executes computer-executable instructions associated with at least one of the user interface or the interactive element.

2. The system of claim 1, wherein the user interaction comprises one or more natural user interface gestures.

3. The system of claim 1, wherein the user interaction enables confirmation of correctness of the attribute or incorrectness of the attribute.

4. The system of claim 1, wherein the user interaction enables editing of the attribute data.

5. The system of claim 1, wherein the interactive element includes one or more states that enable presentation of live and historical feedback of other users.

6. The system of claim 1, wherein the user interaction provides relevance of the entity or entity attribute as part of the feedback.

7. The system of claim 1, wherein the interactive element includes one or more states that enable user interaction to change ranking of the entity or the entity attribute.

8. The system of claim 1, further comprising a list feedback element that enables manipulation of multiple entity/attribute items in a list of the structured data.

9. A method performed by a computer system executing machine-readable instructions, the method comprising acts of:
   implementing feedback elements in association with web and structured data results in a user interface, the feedback elements enable interaction with attribute values and list items as user feedback related to correctness of the attribute values and list items in a gestured-enabled search environment; and
   processing a received gesture to interact with at least one of the attribute values or the list items as enabled by the feedback elements.

10. The method of claim 9, further comprising accessing data sources related to other user inputted attribute values and presenting the other user inputted attribute values as part of the list items.

11. The method of claim 9, further comprising providing a list feedback element of the feedback elements that enables feedback on an ordered list with respect to addition of entries, relevance, and removal of duplicate entries using corresponding gestures.

12. The method of claim 9, further comprising implementing a fact feedback element as one of the feedback elements that enables different visual states related to value operations.

13. The method of claim 9, further comprising defining properties with and gestures for a fact feedback element related to attribute type, original value of the attribute, state, and suggested value.

14. The method of claim 9, further comprising defining properties with and gestures for a result list feedback element related to value of a list item, original position of a list item, and suggested position of a list item.

15. The method of claim 9, further comprising presenting realtime data from other users in response to a gesture, and enabling selection of the realtime data.

16. A computer-readable medium comprising computer-readable instructions that when executed by a processor, cause the processor to perform acts of:
   implementing a fact feedback element in association with web and structured data results in a user interface, the fact feedback element enables interaction with attribute values of items in a gestured-enabled search environment;

implementing a list feedback element in association with the web and structured data results in the user interface, the list feedback element enables manipulation of a list of the items in the gestured-enabled search environment; and receiving gestures that enable interaction with the attribute values and the list of the items to provide relevance and correctness feedback as to the attribute values and the list of the items.

17. The computer-readable medium of claim 16, further comprising suggesting and presenting the list of items based on crowd-sourced data and social network data.

18. The computer-readable medium of claim 16, further comprising receiving gestures that transit states to at least one of mark and edit values, remove duplicate items of the list, add items to the list, or reposition items on the list.

19. The computer-readable medium of claim 16, further comprising visually differentiating in a user interface between operations associated with the fact feedback element and operations associated with the list feedback element.

20. The computer-readable medium of claim 16, further comprising receiving gestures that enable feedback related to relevance and correctness of non-text content.

\* \* \* \* \*